United States Patent [19]
Wagner

[11] 4,317,259
[45] Mar. 2, 1982

[54] MOLDING APPARATUS

[75] Inventor: Richard C. Wagner, Frankfort, Ill.

[73] Assignee: Hollymatic Corporation, Park Forest, Ill.

[21] Appl. No.: 161,021

[22] Filed: Jun. 19, 1980

Related U.S. Application Data

[63] Continuation-in-part of Ser. No. 86,761, Oct. 22, 1979.

[51] Int. Cl.³ ............................................. A22C 7/00
[52] U.S. Cl. ......................................... 17/32; 17/38
[58] Field of Search ............... 17/32, 38, 39, 40, 41; 53/122, 530, 527

[56] References Cited

U.S. PATENT DOCUMENTS

| | | | |
|---|---|---|---|
| 3,747,160 | 7/1973 | Holly et al. | 17/32 |
| 4,108,063 | 8/1978 | Randolph | 53/527 X |
| 4,118,831 | 10/1978 | Holly et al. | 17/32 |

Primary Examiner—Willie G. Abercrombie
Attorney, Agent, or Firm—Wegner, Stellman, McCord, Wood & Dalton

[57] ABSTRACT

A molding apparatus and method for molding patties of ground raw meat and the like that has a hopper for holding a supply of the meat, a mold having a patty shaped mold cavity, a ram equipped pressure chamber into which the meat is moved from the hopper and from which it is forced into a patty shaped mold cavity in the mold, means for moving the mold between a filling position for the cavity and an ejecting position for removal of the patty from the cavity, and the ram being reciprocable in the pressure chamber toward and away from the fill and exit openings thereby tending to create a vacuum in the pressure chamber on the movement away from the opening and venting the chamber to relieve this vacuum.

7 Claims, 5 Drawing Figures

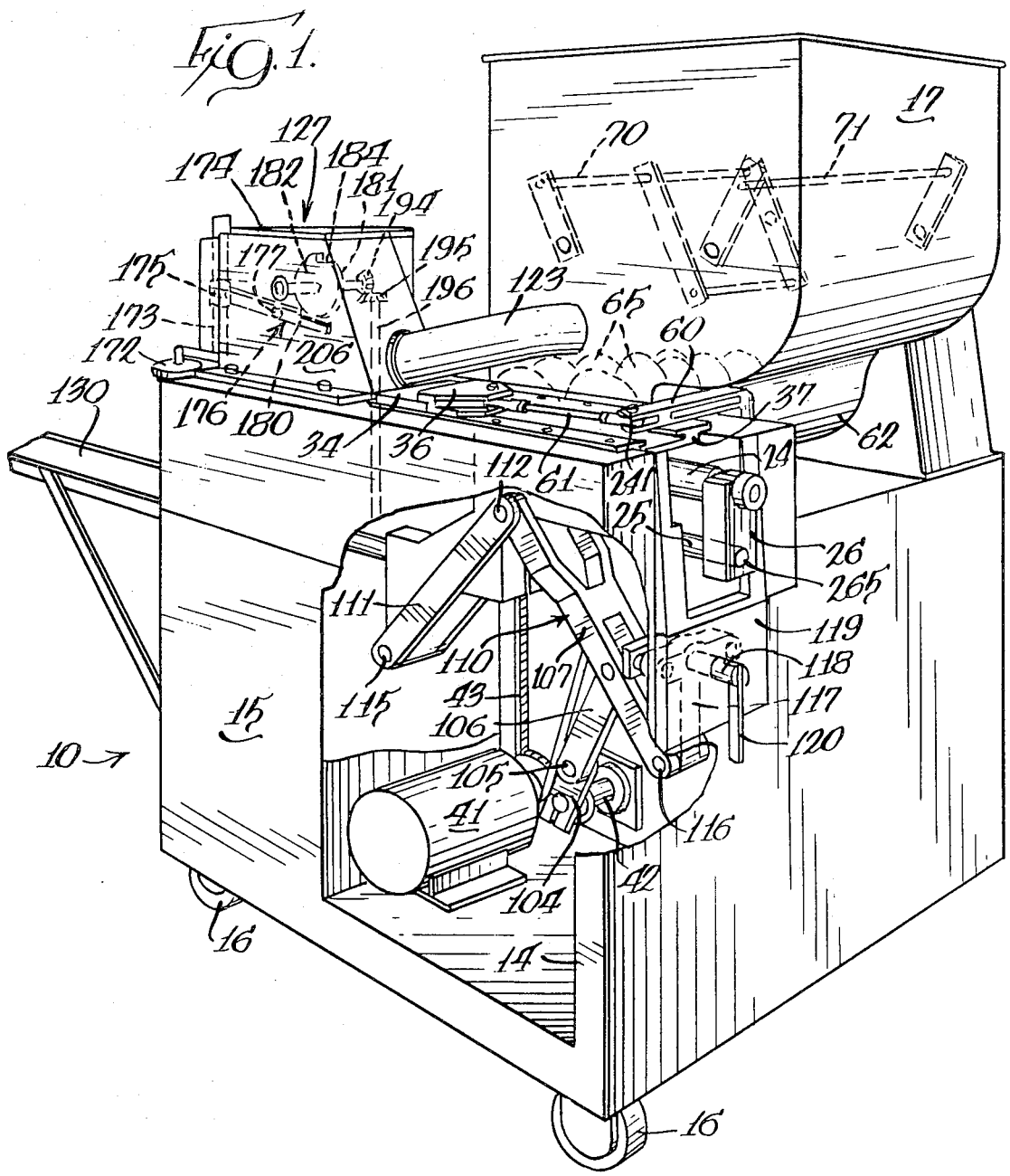

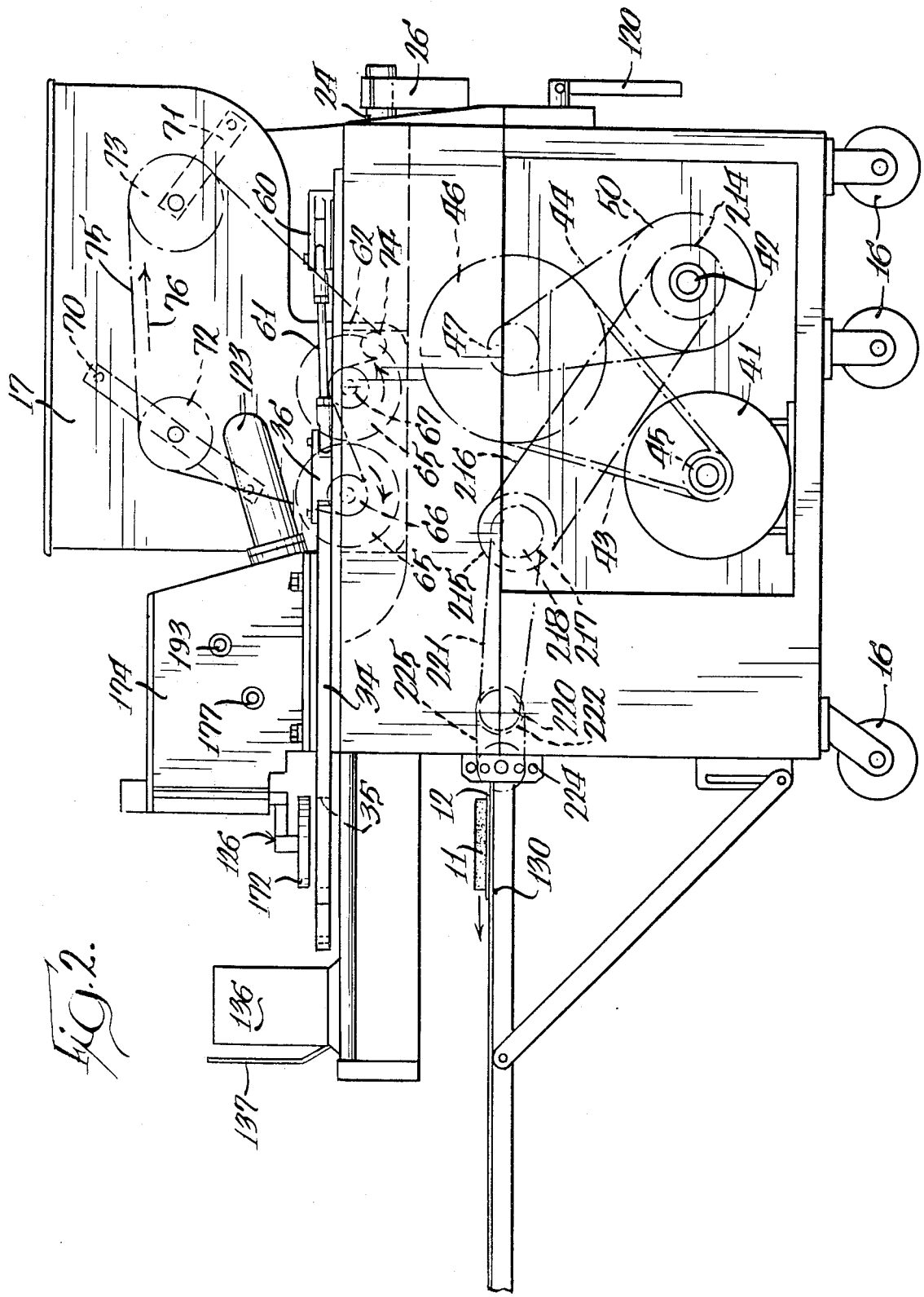

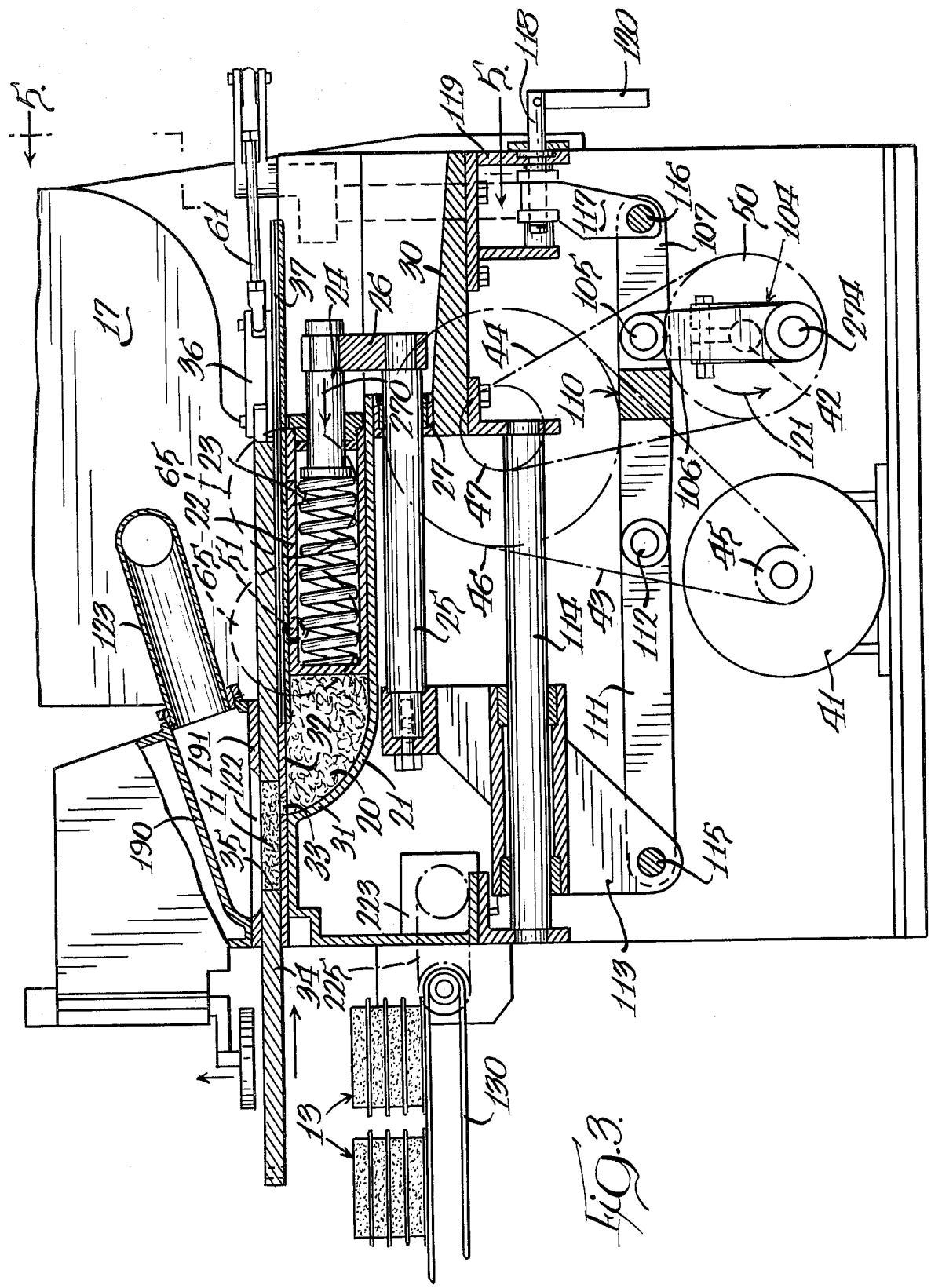

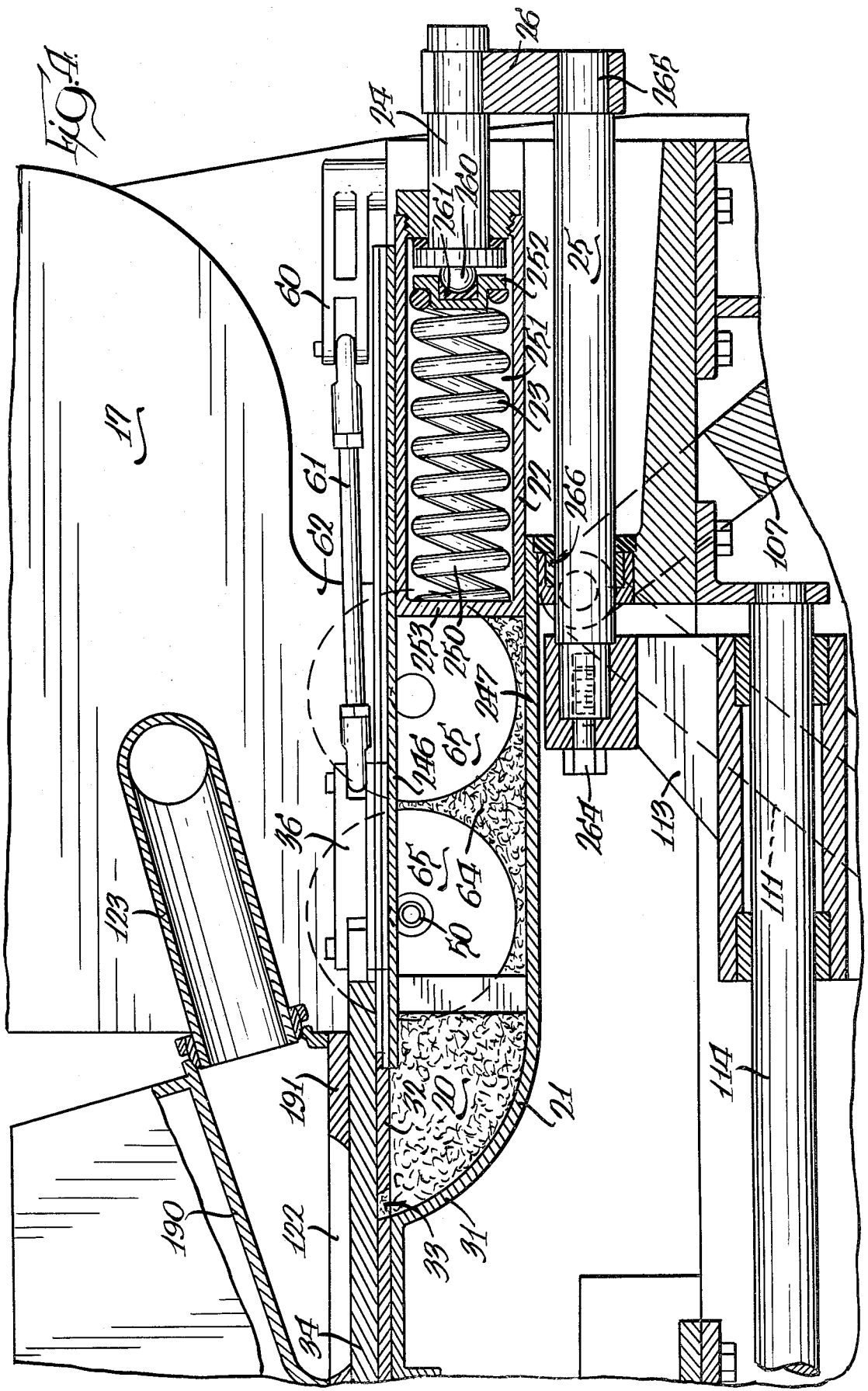

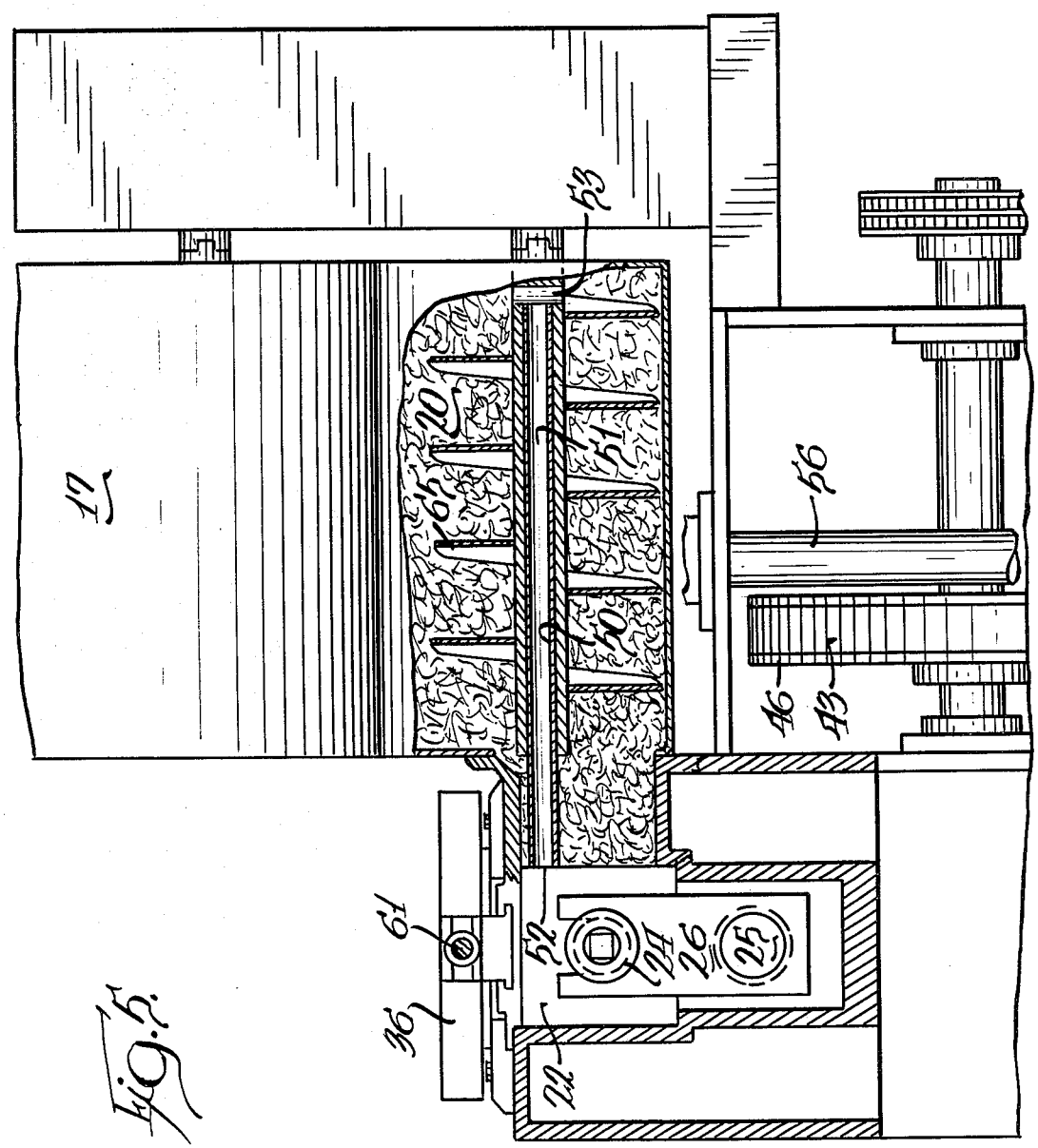

MOLDING APPARATUS

CROSS-REFERENCE TO RELATED APPLICATION

This application is a continuation-in-part of my co-pending application Ser. No. 86,761, filed Oct. 22, 1979.

BACKGROUND OF THE INVENTION

This invention relates to a molding apparatus for molding articles such as patties from moldable material such as ground raw meat. In the above application there is disclosed a typical apparatus in which a pressurizing ram is reciprocated in a chamber for pressurizing the meat in this chamber and forcing it into one or more mold openings. Meat is fed into the chamber by transfer means such as at least one rotary auger that feed meat from a hopper into the chamber from which it is forced by the ram into the mold opening.

It has been discovered that if the meat is a ground beef mix that is all fresh beef with a high fat content such as about 25% and is relatively warm such as at a temperature of about 45° F. the reciprocating ram in the pressure chamber tends to overwork the meat thereby causing fat separation and lumps of fat which eventually appear in the final patty. These lumps are not only unsightly but generally degrade the patties as to cooking ability, flavor and texture. A study indicated that this problem was particularly acute when the machine was operated at high speed as the first withdrawal of the ram preparatory to making a new forward pressure stroke tends to create a partial vacuum in the pressure chamber so that more meat than is required to form the patty was introduced into the pressure chamber. Of this excess amount of meat the following forward or pressurized portion of the ram stroke moves this portion of meat, which was larger than required to form the patty or patties, back into the hopper so that on every stroke excess meat was forced back and forth between the hopper and the pressure chamber so that the relatively warm meat quickly became overworked with the above separation of fat and degrading of meat.

SUMMARY OF THE INVENTION

In order to prevent this overworking and fat separation and formation of unsightly and degrading lumps of fat in the formed patties means are provided to vent the chamber to relieve the vacuum so that excessive amounts of meat will not be drawn into the chamber and reworked and degraded in the above manner. In one embodiment of the vent means a vent passage was provided in one of the two augers and arranged coaxially thereof. This vent opening in one embodiment was a coaxial hole in one of the two augers having a diameter of about 1⅜ inch and the entrance to this opening or hole was at the pressure chamber positioned so that when the ram was in its forwardmost pressurizing position the hole was covered up by the ram so as to prevent escape of excess meat. This hole was not uncovered until the ram had been retracted approximately ½ inch.

The exit end of this hole was within the hopper at a point remote from the pressure chamber so that vented air that carried particles of meat with it would deposit these particles back into the hopper.

The provision of the vent means relieves any possible air pressure build up during the forward motion of the ram so that the ground beef that had entered the chamber was not forced out and back into the hopper by increasing air pressure in that the air pressure was not permitted to increase. Observations of a machine in operation with this air vent means and method shows that there is very little if any fat separation during a run of about 900 pounds of meat.

The most pertinent prior art of which I am aware are U.S. Pat. Nos. 2,757,411; 3,137,029; 3,293,688; 3,312,997; 3,388,529; 3,526,924; 3,589,711; 3,747,160; 3,964,114 and 4,153,974, most of which are assigned to the assignee hereof. None of these prior art patents, however, disclose and claim the inventions that are disclosed and claimed herein.

BRIEF DESCRIPTION OF THE DRAWINGS

FIG. 1 is a perspective view of a molding apparatus embodying the invention in which successive flat patties of ground raw meat are molded at high speed and with precision, a portion of this Figure is broken away for clarity of illustration.

FIG. 2 is a side elevational view of the illustrated embodiment of the mold plate in extended position following removal of a patty from a patty shaped cavity in the mold plate.

FIG. 3 is a view similar to FIG. 2 but illustrating the ram in extended position.

FIG. 4 is a fragmentary longitudinal and vertical sectional view taken through the longitudinal center of the apparatus and showing the pressure ram in retracted position.

FIG. 5 is a fragmentary view partially broken away of a vertical sectional view taken substantially along line 5—5 of FIG. 3.

DESCRIPTION OF THE PREFERRED EMBODIMENT

The embodiment shown in the above drawings is a molding apparatus 10 for molding a series of flat patties 11 of ground raw meat or the like each resting upon a paper separator sheet 12 for supporting each patty and separating it from the next patty, whether in stacks of one patty each as shown in FIG. 2 or of several patties each as illustrated by the two stacks 13 of four patties each illustrated in FIG. 3.

The apparatus comprises a frame 14 enclosed by a thin sheet metal skin 15 and movably supported upon rollers 16 in the customary manner.

Supported on the frame 14 is a hopper 17 for retaining a supply of meat such as ground raw beef illustrated by the mass of ground meat 20 including that located in the pressure chamber 21 in front of the horizontally reciprocable pressure ram 22.

In order to limit the maximum pressure applied to the meat 20 in the pressure chamber 21 there is provided a helical compression spring 23 within the pressure ram 22 and a ram drive shaft 24 which in turn is attached to a ram drive bar 25 that is substantially parallel to the drive shaft 24 and connected to it by a yoke bar 26 with the drive bar 25 being located externally of the pressure chamber 21. The drive bar 25 is mounted in a bearing 27 which is located in a support part 30 of the frame 14. This bearing permits horizontal sliding movement of the drive bar 25 relative to the frame 30 and thereby horizontal movement of the pressure ram 22 by way of the ram drive shaft 24 and yoke bar 26.

Closing the top of the pressure chamber 21 at the upwardly curved front end 31 is a flat fill plate 32 containing a filling aperture 33 therein.

Positioned on the top of the fill plate 32 for horizontal sliding movement thereon is a mold plate 34 containing a patty shaped cavity 35 extending through the top and bottom surface. This mold plate 34 is attached at its rear end to a mold plate carriage 36 which is guided for horizontal movement in a track plate guide 37 that extends across the top sides of the frame 14.

Power is supplied to the apparatus 10 by an electric motor 41 which is mounted on the bottom of the frame 14. The motor in the illustrated embodiment operates at about 1200 rpm and rotates a drive shaft 42 at 66 rpm in this embodiment through a belt 43 and chain 44 by way of a series of pulleys 45, 46, and sprockets 47 and 50. As can be seen in FIG. 2, for example, the series of pulleys and sprockets 45-50 are arranged with the belt 43 and chain 44 to reduce the speed without requiring a gear speed reducer as is customary in patty machines of this type.

The drive shaft 42 (FIGS. 2 and 3) is held in bearings 52. Arcuate oscillation of the shaft 56 causes arcuate movement of the drive rod arm 60 and thereby longitudinal reciprocation of the drive rod 61 and mold plate carriage 36, and therefore the mold plate 34, that is attached thereto. The arm 60 and drive rod 61 are connected by a hinge 241.

The pressure chamber 21 receives ground meat or the like from the hopper 17 at a downwardly recessed portion 62 of the hopper bottom. This recessed portion extends down along one side of the hopper and is provided with a large, elongated, horizontal opening 64 leading to the pressure chamber 21. Meat is supplied to the pressure chamber 21 by a pair of transverse side-by-side augers 65. These augers carry on an adjacent end of each a sprocket 66 and 67. Also journalled in the hopper 17 at the upper area above the augers are a pair of rotatably mounted meat tumblers 70 and 71 each carrying a sprocket 72 and 73. These sprockets 66 and 67 and 72 and 73 and an idler sprocket 74 are connected by an endless drive chain 75. The chain is adapted to be moved in a clockwise direction as viewed in FIG. 2 and as indicated by the arrow 76 whereupon it rotates tumblers 70 and 71 in a clockwise direction and the augers 65 counter to each other to force meat through the elongated side opening 64 into the one side of the pressure chamber 21.

The forward end of the drive shaft 42 carries a crank 104 rotatable therewith. This crank has one portion clamped to the shaft 42 as illustrated in FIG. 3 and the opposite end hingedly attached by a hinge pin 105 to a link 106 whose opposite end is attached to a first toggle linkage 107. The toggle 110 comprises two elongated linkages 107 and 111 hingedly connected at their ends around a pin 112. The opposite end of the second linkage 111 is hingedly attached to a carriage 113 that is slidable on a support rod 114 for movement in a horizontal path. The bottom end of this carriage 113 is connected to the toggle 110 while the top end is connected to the ram drive bar 25. This drive bar 25 is integrally connected to the ram drive shaft 24 through the yoke bar 26 as described above so that flexing of the toggle 110 about the hinge pin 112 and the hinge connection 115 on the carriage 113 causes horizontal movement of the ram 22.

The end of the toggle 110 opposite to the carriage 113 is hingedly connected about a pin 116 and this pin 116 is mounted on a pivot part 117. In order to adjust the length of stroke of the ram 22 the pivot part 117 has a threaded opening therein substantially parallel to the ram 22 and this opening is engaged by a threaded rod 118 that is rotatably held in a mounting 119 so as to be turned by an external handle 120.

As can be seen in FIG. 3 rotation of the crank 104 in the direction 121 causes reciprocation of the pressure ram 22 through its range of movement. The length of this range of movement or the forward movement of the ram 22 toward the filling aperture 33 is determined by the position of the pivot part 117 which in turn is determined by the adjustment of the threaded rod 118 by means of its operating handle 120. This occurs because the position of the pivot part 117 determines the rear position of the ram 22 which in turn determines the forward position of the ram.

As the ram 22 is moved forwardly to the position shown in FIG. 3 it of course forces meat 20 in front of it up through the aperture 33 into the patty shaped mold cavity 35. Air trapped in the empty cavity and meat products such as meat liquid and small particles of meat are forced upwardly through air release slots 122 and through a pipe 123 back into the hopper 17. These air release slots are described and claimed in my copending application Ser. No. 944,000, filed Sept. 30, 1978, now U.S. Pat. No. 4,233,710, and assigned to the assignee hereof.

FIGS. 1 and 2 illustrate the apparatus 127 for applying a separator sheet 12 such as a sheet of oil impervious paper to each of the patties 11. This is shown in greater detail in the above copending application 86,761. By the operation of a knockout mechanism 127 the patties are ejected from the mold cavity 35 and are collected on an endless conveyor belt 130 in stacks of one or more patties. The sheets 12 are held in a stack comprising a supply of the sheets at the forward end of the apparatus beyond the extended position of the mold plate. This stack is retained in a vertical holder 136 and the individual sheets 12 are perforated adjacent one edge and retained on an inclined pin 137 at one edge of the sheets. Such a retaining means for a stack of sheets is disclosed in certain of the prior patents listed herein.

In order to dislodge the patties 11 from the mold cavity 35 when the mold is in extended position as illustrated in FIG. 2, there is provided a knockout cup 172 mounted on the lower end of a vertically movable arm 173. This vertical arm 173 is movably mounted in a housing 174 and is hingedly connected by means of a hinge member 175 to a cam follower arm 176 that is arcuately movable about a fulcrum 177.

The opposite end 180 of this arm 176 comprises a cam follower and is held in engagement with the periphery 181 of a rotatable circular cam 182 by means of a spring. This circular cam 181 has a right angled notched part 184 so that when the cam follower end 180 of the arm 176 is in this notch the knockout cup 172 is in its lowermost position to dislodge a patty 11 from the mold cavity 35. Then, further rotation of the cam 182 causes the arm 176 to be rotated in a clockwise direction as viewed in the drawings to lift the cup 172 from the mold cavity 35.

The cam 182 is rotated by being mounted on a rotatable shaft 193 which carries a bevel gear 194 engged by a second bevel gear 195 that is mounted on a vertical rotary shaft 196.

The operating parts of the patty removal device including the cup 172, mounting arm 173, hinge member 175 and fulcrumed cam follower arm 176 are all made of lightweight metal parts so that movement into and back out of the mold cavity 35 between the extreme positions shown in FIG. 4 is rapid and sharp.

As can be seen in the drawings, it is necessary to raise the air vent chamber 190, air release plate 191 that is attached thereto, vent pipe 123 and knockout housing 174 in order to provide access to the mold plate 34 for cleaning, replacement with a different sized mold plate, or for any other reason.

The drive shaft 42 rotates a sprocket 214 which drives a sprocket 215 by means of an endless chain 216. The sprocket 215 has two smaller sprockets 217 and 218 concentric therewith and driven thereby. The sprocket 217 rotates a further pulley 220 by means of an endless chain 221. The sprocket 220 operates through an electric clutch 222 to rotate a sprocket 223 when this electric clutch is energized in the usual manner.

The sprocket 223 is held in a structure 224 on the exterior of the apparatus and is driven from the sprocket 220 of the clutch 222 by means of a chain 225. This sprocket 223 engages and drives the patty receiving belt 130 when the clutch 222 is energized. This driving of the patty receiving belt 130 is in increments with each increment of movement being equal to the spacing between adjacent stacks 13 of patties 11 as illustrated in FIG. 3. This spacing will of course be between individual successive patties if the timing mechanism (not shown) is set so as to limit each stack to a single patty.

FIG. 4 shows in section the details of the pressure ram 22 and associated structure. As is shown in FIG. 10 the ram 22 slides between the parallel top and bottom walls 246 and 247 defining the pressure chamber 21. The top wall 246 is joined to the fill plate 32.

The compression spring 23 is retained within a hollow chamber 251 within the ram where it abuts, at its front end 250, against the inner surface of the end of the ram 22 and at its rear against a stop plate 252 centered around an axial member 260 engaging a bearing member 261.

Also as shown in FIG. 4, the inner end 263 of the drive bar 25 extends into the carriage 113 and is attached thereto by a bolt 264. The outer end 265 of the ram drive bar 25 is attached to the yoke bar 26 as by welding. The carriage 113 when reciprocated in a horizontal path in the manner previously described is guided by the engagement of the ram drive bar 25 in a bearing 266.

When the ram 22 is retracted from the position shown in FIG. 3 to the fully retracted position of FIG. 4 it tends to create a suction in front of it particularly where the ground beef consists of large amounts (up to 100%) of fresh trimmings with a high fat content, such as about 25%, and a relatively warm temperature, such as 45°. This type of high fat, warm, fresh beef tends to be overworked in its movement from the hopper 17 by means of the augers 65 into the pressure chamber 21.

Studies indicated that the rapid retraction of the ram 22 to the position of FIG. 4 often creates a vacuum which results in more meat being drawn into the compression chamber by the vacuum than is required. Then, upon the next forward or pressure stroke of the ram (forwardly to the position in FIG. 3) excess meat is forced back into the hopper in spite of the partial blocking action of the pair of augers 65.

The rapid retraction and pressure strokes of the ram tends to continue to draw excess meat in and force this excess out so that the meat was overworked. This overworking often causes the separation of fat particles in the meat as discussed above.

In order to prevent this problem the present invention provides a venting means for venting the chamber to atmosphere to relieve this condition. One embodiment of such a venting means is disclosed in the drawings and comprises a hollow tube 50 coaxially positioned within one auger 65 that is nearer to the pressure chamber 21. This coaxial tube, as is shown most clearly in FIG. 4, has an internal passage 51 with one end 52 at the pressure chamber 21 and the other end 53 emptying into the interior of the hopper 17.

In this one embodiment the vent passage 51 was about $1\frac{3}{8}$ inches in diameter and was located so that after the ram 22 had moved about $\frac{1}{2}$ inch from its forwardmost position the hole 51 was uncovered allowing air to move from the rear or other end 53 of the passage 51 through the passage and into the pressure chamber to relieve the vacuum therein. This prevented the vacuum from drawing excessive amounts of meat into the pressure chamber.

Then when the retracted ram was moved from the position of FIG. 4 to the end of the pressure stroke shown in FIG. 3 any air pressure build up in front of the ram face 253 was relieved by forcing this air out through the vent tube 50. Because the tube empties into the hopper 17 any entrained particles of meat or meat products would merely be carried back into the hopper. As the ram 22 approaches the end of its forward pressure stroke or the position shown in FIG. 3 the final pressure is exerted on the meat to fill the mold opening or cavity and form the patty 11 therein as shown in FIG. 3. It is here where maximum molding pressure is exerted on the meat and in this position the ram 22 covers the air passage 51 as shown in FIG. 3.

THE OPERATION OF THE ILLUSTRATED EMBODIMENT

Prior to the operation of the machine the proper size of mold plate 34 is selected and installed for the desired mold cavity 35 size in order that the patties 11 will be of a preselected weight. Thus in one embodiment of the invention mold plates were available to produce patties 11 from one ounce to fourteen ounces in size. With the installation of the mold plate 34 to make the desired size patty, the stroke of the pressure ram 22 is adjusted so that this stroke is only sufficient to force the required amount of meat from the supply 20 in front of the ram 22 into the mold cavity 35 through the fill slot 33. Thus for small patties the length of the stroke 270 of the ram 22 will be shorter while for larger patties it will of course be longer.

This adjustment of the length of stroke of the ram 22 is accomplished by means of the movable pivot part 117 to which one end of the toggle unit 110 is hingedly attached by the pin 116. Because the toggle 110 has a fixed length between the end pivot pins 115 and 116 any movement of the pivot part 117 to the right or left as viewed in FIG. 6 will shorten or lengthen, respectively, the length of stroke of the carriage 113 to which the ram 22 is attached by means of the drive shaft 24, yoke bar 26 and ram drive bar 25.

With the parts in the position shown in FIG. 1, the crank 104 on the drive shaft 42 is aligned with the link 106 and thereby holds the first 107 and second 111 toggle linkages of the toggle 110 in elevated position by reason of the hinged connection of the drive link 106 to the crank 104 by means of the end hinge pins 105 and 274.

This elevated position of the toggle 110 moves the carriage 113 its furthest distance to the right as shown in FIG. 4 and retains the pressure ram 22 in retracted position.

Although the illustrative embodiment shows only a single mold cavity in the mold plate for making one patty at a time, the apparatus of this invention obviously can be used to make multiple patties simultaneously by providing a multi-cavity mold plate.

Continued rotation 121 of the drive shaft 42 causes the crank 104 to lift the toggle 110 to the raised position of FIG. 1 through the link 106 that is movably attached at the pin 105 and the pin 274 to the crank and the first toggle linkage 107, respectively. During this upward movement of the toggle 110 the ram 22 is retracted.

The movement of the mold plate 34 from the fill position of FIG. 3 to the extended patty removal position of FIG. 2 and back again to the position of FIG. 3 constitutes one cycle of operation.

Various features of the molding apparatus are covered by earlier patents to the asme assignee in the prior patents mentioned herein.

Having described my invention as related to the embodiment set out in the accompanying drawings, it is my intention that the invention be not limited by any of the details of description, unless otherwise specified, but rather be construed broadly within its spirit and scope as set out in the appended claims.

I claim:

1. Molding apparatus surrounded by air for molding patties of ground raw meat, comprising:
   a hopper for holding a supply of said meat;
   a mold having a patty shaped mold cavity;
   exit opening means from said hopper;
   a pressure chamber for receiving said meat from said hopper through said exit opening;
   transfer means in said hopper for moving said ground raw meat toward said exit opening from the hopper and into said pressure chamber;
   means defining a fill opening extending between said pressure chamber and a said mold cavity for filling said cavity with pressurized meat;
   a pressure ram in said pressure chamber, said chamber having a meat pressurizing chamber section from which said meat is forced by said ram through said fill opening and into a said mold cavity;
   means for moving said mold between a filling position for said cavity and an ejecting position for removal of said patty from said cavity;
   means for reciprocating said ram in its said pressure chamber toward and away from said fill and exit openings thereby tending to create a vacuum in said chamber section on said away movement; and
   means for venting said chamber to the surrounding air to relieve said vacuum with air from said surrounding air.

2. The apparatus of claim 1 wherein said movement of said mold is linear and said transfer means comprises at least one auger extending transversely to said linear movement of said mold.

3. The apparatus of claim 1 wherein said pressure chamber is positioned at one side of said hopper and is provided with a side access opening communicating with said hopper for flow of meat directly from said hopper into the side of said pressure chamber at said side opening under the urging of said transfer means.

4. Molding apparatus for molding patties of ground raw meat, comprising:
   a hopper for holding a supply of said meat;
   a mold having a patty shaped mold cavity;
   exit opening means from said hopper;
   a pressure chamber positioned at one side of said hopper and provided with a side access opening communicating with said hopper for flow of meat directly from said hopper into the side of said pressure chamber at said side opening under the urging of said transfer means in said hopper for moving said ground raw meat toward said exit opening from the hopper and into said pressure chamber;
   means defining a fill opening extending between said pressure chamber and a said mold cavity for filling said cavity with pressurized meat;
   a pressure ram in said pressure chamber, said chamber having a meat pressurizing chamber section from which said meat is forced by said ram through said fill opening and into a said mold cavity;
   means for moving said mold between a filling position for said cavity and an ejecting position for removal of said patty from said cavity;
   means for reciprocating said ram in its said pressure chamber toward and away from said fill and exit openings thereby tending to create a vacuum in said chamber section on said away movement; and
   means for venting said chamber to relieve said vacuum, said hopper having a depressed bottom area, said movement of said mold is linear, said transfer means comprises at least one auger extending transversely to said linear movement of said mold and located in said bottom area and said means for venting comprises an air passage means in said auger having one end at said pressure chamber and a vent end spaced from said chamber.

5. The apparatus of claim 4 wherein said air passage is substantially coaxial with said auger.

6. The apparatus of claim 4 wherein said vent end is located in said hopper.

7. Molding apparatus for molding patties of ground raw meat, comprising:
   a hopper for holding a supply of said meat;
   a mold having a patty shaped mold cavity;
   exit opening means from said hopper;
   a pressure chamber positioned at one side of said hopper and provided with a side access opening communicating with said hopper for flow of meat directly from said hopper into the side of said pressure chamber at said side opening under the urging of said transfer means in said hopper for moving said ground raw meat toward said exit opening from the hopper and into said pressure chamber;
   means defining a fill opening extending between said pressure chamber and a said mold cavity for filling said cavity with pressurized meat;
   a pressure ram in said pressure chamber, said chamber having a meat pressurizing chamber section from which said meat is forced by said ram through said fill opening and into a said mold cavity;
   means for moving said mold between a filling position for said cavity and an ejecting position for removal of said patty from said cavity;
   means for reciprocating said ram in its said pressure chamber toward and away from said fill and exit openings thereby tending to create a vacuum in said chamber section on said away movement; and
   means for venting said chamber to relieve said vacuum said hopper having a depressed bottom area, said movement of said mold being linear and said transfer means comprising a pair of adjacent parallel augers extending transversely to said linear movement of said mold and located in said bottom area, said access opening being elongated and located to receive meat from said augers, said means for venting comprising an air passage means in at least one of said augers having one end at said pressure chamber and a vent end spaced from said chamber, said air passage being substantially coaxial with said auger and said vent end is located in said hopper.

* * * * *